Jan. 3, 1939.  A. G. ROSE  2,142,920
CHECKING APPARATUS
Filed March 3, 1938
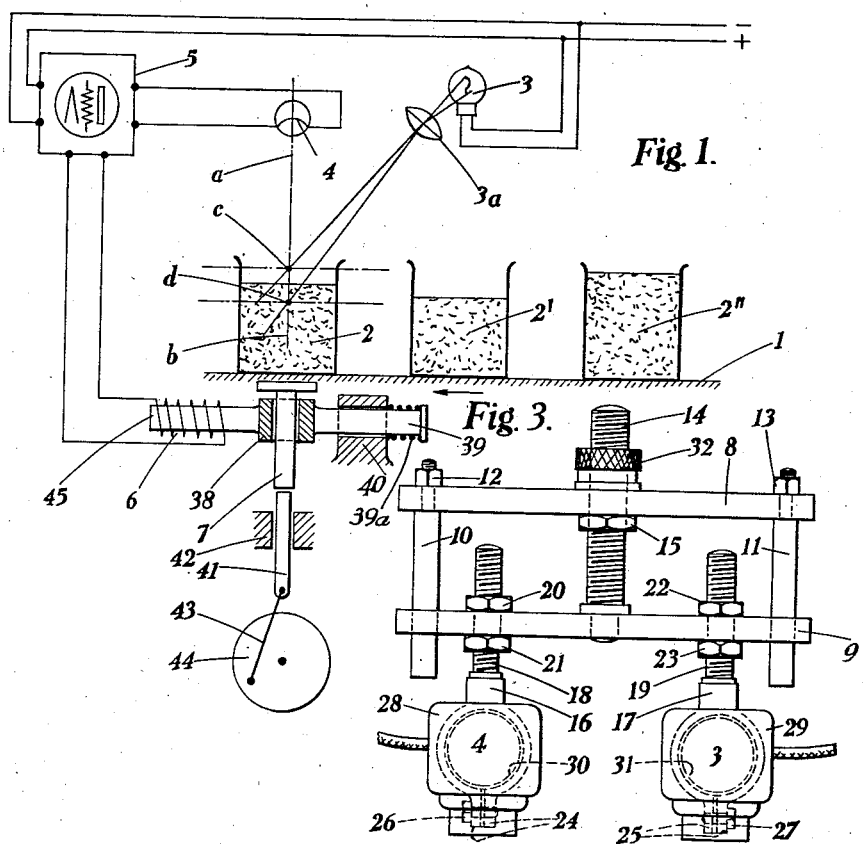
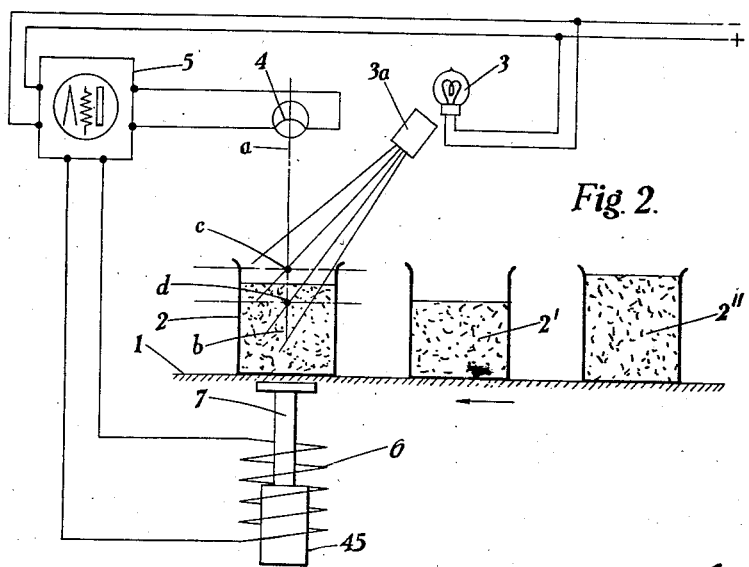
INVENTOR
A. G. ROSE.
BY
ATTORNEYS.

Patented Jan. 3, 1939

2,142,920

UNITED STATES PATENT OFFICE 2,142,920

CHECKING APPARATUS

Alfred German Rose, Gainsborough, England, assignor to Rose Bros. (Gainsborough) Limited, Gainsborough, England, a British company Application March 3, 1938, Serial No. 193,805
In Great Britain December 5, 1936

3 Claims. (Cl. 209—82)

This invention relates to the checking of the levels of substances such as powders, granulated, flanked or like material, in cartons, and like containers either separately or when the containers are passing serially on a conveyor or like device, as for example between the stages of filling and closure.

The object of the invention is to enable the levels of the substance in the containers to be checked, preferably whilst the containers are being conveyed serially on a conveyor operating either continuously or intermittently, so that in the event of an over or under-filled container passing the device, the latter automatically operates to indicate the faulty container and/or to cause ejection of said container from the conveyor.

In the method of checking the levels of substance within the containers according to the invention, each container is passed under a downwardly-directed, uni-directionally responsive, light sensitive device, and a defined beam of light is directed into the container obliquely to the axis of the light sensitive device so that the upper and lower marginal rays of the beam intersect the axis of the light sensitive device. The light sensitive device, which may be a photo-electric cell, thus responds to the illumination produced by the beam of light on the surface of the substance only when the level of such surface is between the intersections of the upper and lower marginal rays of the beam and the axis of the light sensitive device.

Preferably the light sensitive device is arranged with its axis vertically over the container to be examined, and the beam of light is directed obliquely thereinto.

When a plurality of containers are to be examined, these may be arranged on a conveyor so that they are moved serially, either with a continuous or an intermittent movement, under the downwardly directed light sensitive device, and a light source is arranged so that the beam therefrom is directed into a container when positioned for examination. Although the light sensitive device may be employed to operate a visual and/or an audible signal, it is preferably associated with rejecting mechanism so that when on examination a container is found to be overfilled or underfilled, the operation of the rejecting mechanism may be initiated by the light sensitive device to reject the faulty container.

The light sensitive device may operate to prevent initiation of the rejecting mechanism when it is excited by illumination produced on the surface of the substance in the faulty container, or alternatively, the rejecting mechanism may be arranged to be initiated by response of the light sensitive device. In this latter case it is preferable for two separate beams of light to be employed, these being arranged one above the other so that the lower marginal ray of the upper beam intersects the axis of the light sensitive device at the upper permissible level of the substance, and the upper marginal ray of the lower beam intersects the said axis at the lower permissible level of the substance.

When it is desired that the containers should be filled to a precise level without permitting substantial variation therefrom, a focused beam of light may be employed, the beam being arranged so that its focus coincides with the axis of the light sensitive device at a point within the desired level for the substance. Alternately, a very narrow beam may be employed.

The apparatus for carrying the invention into effect comprises essentially means for directing a defined beam of light into the container, means sensitive to the illumination produced thereby on the surface of the substance, and arranged so that the axis of said means intersects the beam of light, and means associated with said light sensitive device to indicate when said device responds to illumination of the surface of the substance in the container by the light beam.

In order that the device may be employed for checking levels between any desired limits, a variety of adjustments may be provided for the beam of light and/or for the light sensitive device. For example, in order to increase or decrease the amount by which the permissible levels of the substance may vary, the light beam may be arranged to be increased or decreased in width, or the divergence of the beam may be increased or decreased. If, for example, it is desired to raise both the upper and lower permissible levels by substantially the same amount, the inclination of the light beam to the axis of the light sensitive device may be increased, and conversely, if it is desired to lower both these permissible levels, the inclination of the light beam may be decreased.

Alternatively, such raising or lowering of both permissible levels may be achieved by moving the light source and its associated lens system in a direction substantially parallel to the axis of the light sensitive device.

Any combination of the hereinbefore described adjustments may be utilized to vary the levels between which the light sensitive device is responsive.

The source of illumination conveniently comprises an electric lamp in an electric circuit and if desired, this circuit may be provided with an interrupter which closes the circuit only when a container is in alignment with the axis of the light sensitive device.

When the device is intended to regulate the operation of rejecting mechanism for the containers, the light sensitive device may be connected through an amplifier to a solenoid cell which is energized when the light sensitive device is excited by illumination on the surface of the substance in the container. This solenoid is associated with an armature adapted when operated for example, to render the rejecting mechanism inoperative, as by tripping.

Alternatively, in the arrangement where twin beams of light are employed, the armature may be arranged when operated, to initiate the operation of rejecting mechanism, which is otherwise inoperative.

The invention is illustrated by way of example in the accompanying drawing, in which Fig. 1 shows diagrammatically one form of carrying the invention into effect, Fig. 2 shows diagrammatically a slightly different form of carrying the invention into effect, and Fig. 3 shows one convenient form of construction of the invention.

Referring to Fig. 1, the containers, the level of substance within which it is desired to check, are denoted by 2, 2', 2'' and these are arranged serially upon a conveyor represented by 1. The conveyor may move either intermittently, or continuously, and carries the containers 2, 2', 2'' such as cartons which may be filled or partially filled with powder, or granular or like material, in the direction of the arrow.

A carton rejecting device, shown diagrammatically at 7 is arranged so as to be operative to eject each carton as it reaches the position of the carton 2. This rejecting device may for example be operated by the conveyor 1 itself, and may comprise a rejecting plunger 7 supported in a guide 38 which is carried by a member 39, slidable in guides 40 in a direction perpendicular to the direction of sliding of the plunger 7. In alignment with the plunger 7 is arranged a tappet 41, slidable in a guide 42 in the direction of the plunger 7 and connected by a link 43 to a crank 44 which is rotated by the conveyor driving means, or by the conveyor itself so that the tappet 41 makes a forward stroke each time a carton reaches the position 2.

Attached to the member 9 is an armature 45 which is associated with a solenoid 6, so that when this solenoid is energized, the member 39 is moved axially against the action of a return spring 39a until the plunger 7 is out of alignment with the tappet 41 and thus is not actuated thereby.

An electric lamp 3 is arranged above the conveyor in combination with a lens system 3a to throw a divergent beam of light into each carton when in the position shown at 2.

Also above the conveyor 1 is located a light sensitive device 4, in the form of a photo-electric cell, which is responsive to any intense light on its vertical axis a, b. The photo-electric cell is preferably arranged with its axis a, b vertical as shown in the figure, to coincide substantially with the axis of the carton when this reaches the position 2 on the conveyor 1 at which the carton rejecting mechanism 7 is operative.

The axis a, b of the cell is thus intersected by the upper and lower marginal rays of the light beam at c and d respectively, the direction and divergence of the beam of light being arranged so that the points c and d lie respectively in the upper and lower permissible limits to which the carton may be filled. The cell 4 is connected to an amplifier 5, whereby it controls the energization of the solenoid 6 to render the rejecting plunger 7 inoperative when the photo-electric cell 4 is excited.

Alternatively, or additionally, the electro-magnetic means 6 may be employed to operate visible and/or audible signalling devices.

It will be seen, therefore, that when a carton is filled within the levels c and d, the surface of the substance is illuminated by the beam in the portion thereof around the axis a, b of the photo-electric cell. The cell is thus excited by this intense illumination, and operates through the amplifying device 5 to render the carton ejecting apparatus 7 inoperative.

If the level of the substance within the carton is above or below the levels of the points c and d respectively, the illumination produced on the surface of the substance by the light beam is to the right or the left respectively of the axis a, b, and the photo-electric cell is therefore not excited by the illumination produced. In this case the solenoid 6 is not energized, and the tappet 41 thus engages the plunger 7 so that the faulty carton is ejected from the conveyor 1.

In order to vary the permissible limits to which the cartons may be filled, the divergence of the beam of light may be adjusted, or alternatively the obliquity of the beam may be varied, or the light source and its associated lens system may be moved in an upward or downward direction, or in a direction along its axis towards or away from the carton, or in any other manner whereby the area of illumination around the axis a, b of the photo-electric cell is varied.

In the alternative form of carrying out the invention, as illustrated diagrammatically in Fig. 2, the lamp 3 and lens system 3a is replaced by another arrangement whereby two separate beams of light are produced instead of the single beam. These twin beams are preferably arranged one above the other, although they may be directed from different sources if convenient. The lower marginal ray of the upper beam intersects the vertical axis a, b of the photo-electric cell at c and the upper marginal ray of the lower beam intersects the axis at d. In this arrangement, between the permissible limits c to d of filling of the carton, no illumination will be produced on the surface of the filling substance about the axis a, b of the photo-electric cell, whereas if the carton is filled above the level c, or below the level b, the surface of the substance will be illuminated so as to excite the cell 4.

The cell is arranged when excited to energize through the amplifying device 5, a solenoid 6 which moves an armature 45 connected to a carton rejecting plunger 7, so that if a carton is filled above or below the allowable level, it is automatically ejected from the conveyor 1 when it reaches the position 2.

If narrow limits are to be allowed for the filling level of the cartons, a narrow beam of light may be employed instead of the divergent beam shown in Fig. 1, or alternatively, a convergent beam may be employed, arranged with its focus to intersect the axis $a, b$ of the cell 4 at the desired level of the substance.

In the construction form of the device according to the invention as illustrated in Fig. 2, the source of light and its associated lens system are denoted at 3, and the light sensitive cell is denoted at 4. Each of these devices is mounted for rotation about its horizontal axis and also about its vertical axis and for translational movement along its vertical axis. The light source 3, is mounted within a casing 29 which is formed on one of its vertical surfaces with a collar 31 which is clamped by means of a bolt 27 within a split ring member 25 carried at the end of a member 17. This member 17 is provided with an upwardly extending screwed shank 19 which passes freely through the hole in a plate 9, and is secured thereto by means of nuts 22 and 23. These nuts permit translational movement of the light source 3 in a vertical direction, and rotational movement about its vertical axis. Rotational movement of the light source about a horizontal axis may be effected through the medium of the split ring 25 and collar 31 by first loosening the bolt 27. The light sensitive device 4 is similarly mounted within a casing 28 which is provided with a collar 30 engaging the inner surface of a clamping ring 24 by which it is secured through the medium of a bolt 26. The clamping ring is connected to a member 16 provided with a screwed shank 18 which passes through a hole in the plate 9 and is secured thereto by nuts 20 and 21.

In order to provide for a vertical movement of the light source 3 and the light sensitive device 4 simultaneously, the plate 9 is slidable in a vertical direction on guide pins 10 and 11 which project downwardly from a base plate 8 to which they are secured by nuts 12 and 13 respectively. The movable plate 9 is adjustable towards and away from the base plate 8 by means of a fine threaded column 14 which is secured at its lower end in the plate 9 and passes freely at its upper end through a vertical hole in the base plate 8. A knurled adjusting nut 32 engages the screwed column 14 and by rotation of this nut, the movable plate 9 carrying the light source 3 and the light sensitive device 4 may be moved upwardly or downwardly. A lock nut 15 provided on the screw member 14 on the underside of the plate 8 serves to lock the plate 9 in any desired position. The device is supported by means of the base plate 8 above the conveyor for the cartons in any convenient manner.

I claim:

1. Apparatus for checking within limits the levels of substance within a plurality of open-ended containers, comprising a travelling conveyor for said containers, an electric lamp and associated lens system for directing a defined beam of light into the containers to illuminate successively the surfaces of the substance in the containers, a photo-electric cell arranged with its axis to intersect within the container the marginal rays of the beam of light at the upper and lower permissible levels of the substance, rejecting means for the containers, means co-relating the operations of the rejecting means with the movement of the conveyor, electromagnetic means for initiating the operations of mechanism for tripping the rejecting means and rendering same inoperative, and amplifying means controlled by the photo-electric cell to energize the electromagnetic means when the cell is excited by illumination of the surface of the substance.

2. Apparatus for checking within limits the levels of substance within a plurality of open-ended containers, comprising a travelling conveyor for said containers, electrically energized means for directing a pair of defined and separated beams of light into the containers to illuminate the surfaces of the substance in the containers successively, a photo-electric cell arranged with its axis to intersect within the container the lower marginal rays of the upper beam of light at the upper permissible level of the substance and the upper marginal rays of the lower beam of light at the lower permissible level of the substance, automatic rejecting means for the containers, electromagnetic means for initiating the operation of the rejecting means and amplifying means operated by the photo-electric cell to energize the electromagnetic means when the cell is excited by illumination of the surface of the substance.

3. The herein described method of checking within limits the level of an opaque substance within an open-ended opaque container, which consists in passing said container beneath a downwardly directed uni-directionally responsive light-sensitive device, directing a beam of light obliquely onto the material within the container with respect to the axis of the light sensitive device when said container is in the axis of the light-sensitive device, and the upper and lower marginal rays of the beam intercepting the axis of the light-sensitive device.

ALFRED GERMAN ROSE.